United States Patent [19]

Toyoda et al.

[11] Patent Number: 5,590,689

[45] Date of Patent: Jan. 7, 1997

[54] METHOD FOR LINING THE INTERNAL SURFACE OF A PIPE

[75] Inventors: Shigeru Toyoda, Saitama-ken; Shuichi Yagi, Kanagawa-ken; Masaaki Itagaki, Kanagawa-ken; Nobukatsu Ike, Kanagawa-ken; Kenji Ohshima, Kanagawa-ken, all of Japan

[73] Assignees: Tokyo Gas Co. Ltd.; Hakko Co., Ltd., both of Tokyo, Japan

[21] Appl. No.: 609,782

[22] Filed: Mar. 1, 1996

[30] Foreign Application Priority Data

Oct. 27, 1995 [JP] Japan .................... 7-280889

[51] Int. Cl.⁶ .................... F16L 55/18; B32B 35/00
[52] U.S. Cl. .................... 138/97; 138/98; 264/269; 264/35; 156/94
[58] Field of Search ............... 138/97, 98, DIG. 7, 138/DIG. 2; 264/269, 35, 36; 159/94, 98

[56] References Cited

U.S. PATENT DOCUMENTS

| | | | |
|---|---|---|---|
| 4,327,132 | 4/1982 | Shinno | 138/97 X |
| 4,397,890 | 8/1983 | Kinumoto et al. | 138/97 X |
| 4,440,194 | 4/1984 | Kinumoto et al. | 138/97 X |
| 4,600,548 | 7/1986 | Nenna | 264/269 X |
| 4,810,453 | 3/1989 | Clarke et al. | 138/97 X |
| 5,230,842 | 7/1993 | Munde | 138/97 X |
| 5,246,641 | 9/1993 | Perkins et al. | 138/97 X |
| 5,265,648 | 11/1993 | Lyon | 138/98 |
| 5,447,664 | 9/1995 | Ito et al. | 138/97 X |

*Primary Examiner*—Patrick Brinson
*Attorney, Agent, or Firm*—Nikaido, Marmelstein, Murray & Oram LLP

[57] ABSTRACT

There is provided a method for lining the internal surface of a pipe having a first open end and a second open end. Said method comprises the steps of introducing a predetermined amount of a resin into the pipe through the first open end thereof, causing the introduced resin to move through the pipe toward the second open end thereof, so as to form a resin lining layer on the internal surface of the pipe, blowing into the pipe a predetermined amount of flake material and causing the flake material to adhere to the surface of the resin lining layer in the pipe, inserting into the pipe a ball-like pig having a predetermined diameter such that an even resin lining layer having a desired uniform thickness may be formed on the internal surface of the pipe, and causing the inserted ball-like pig to move through the pipe along the entire length thereof, thereby embeding the above flake material into the resin lining layer, and forming on the pipe internal surface an even resin lining layer having a desired uniform thickness.

10 Claims, 4 Drawing Sheets

METHOD FOR LINING THE INTERNAL SURFACE OF A PIPE

BACKGROUND OF THE INVENTION

The present invention relates to a method of lining the internal surface of a pipe, particularly to a method of lining the internal surface of an existing underground gas pipe, water pipe, etc. for the purpose of internal surface repair or rehabilitation thereof.

There have been suggested various methods of lining the internal surface of an existing pipe with a resin so as to carry out pipeline internal surface repair or rehabilitation thereof. For instance, Japanese Patent Gazette 61-24067 discloses a method where a predetermined amount of a liquid resin is introduced into an existing pipe to be treated, and is forced to move through the pipe, by means of a hight speed air flow, so that a desired resin lining layer is formed on the internal surface of the existing pipe.

FIG. 1 illustrates the above-mentioned prior art method. In FIG. 1, reference numeral 1 represents an existing underground pipe to be treated in the resin lining treatment, which is branching from a main pipe 2 and extending to a user's house.

In fact, the pipe 1 is used as a service pipe including a meter riser 3 which extends out of ground surface. The meter riser 3 is provided at one end thereof with a meter (not shown) which shall be removed therefrom so as to form a first open end for the resin lining operation. On the other hand, a pit A is formed by digging at a position where the service pipe 1 is branching from the main pipe 2, so that the branching position is exposed and the service pipe 1 is separated from the main pipe 2 by being separated from a service tee 4. In this way, a second open end is formed on the service pipe 1 for the resin lining operation.

In lining operation, an air blower 5 and a resin mixing/supplying apparatus 6 are connected to the first open end of the service pipe 1, whilst an extra resin receiving tank 8 is connected through a hose 7 to the second open end thereof.

By operating the air blower 5, an air flow having a high speed is generated to cause a mixed liquid resin (supplied from the resin mixing/supplying apparatus 6) to flow into the meter riser 3. Then, by means of the same air flow, the resin is forced to flow into and through the service pipe 1 toward the second open end thereof, so that a resin lining layer c is formed on the internal surface of the pipe 1. A small amount of an extra resin is caused to flow out of the pipe 1 so as to be received into the receiving tank 8 via the hose 7.

However, in the above-mentioned conventional method, the resin lining layer c formed on the internal surface of the surface pipe 1, has at least the following two defects as shown in FIGS. 4 and 5.

As illustrated in FIG. 4, before the resin lining layer c is solidified on the internal surface of the pipe 1, the resin on the top will flow down to the bottom of the pipe, resulting in a problem that the upper half of the resin lining layer c has a relatively thin thickness d, whereas the lower half of the resin lining layer c has a relatively thick thickness e.

As illustrated in FIG. 5, since a waving phenomenon g is easy to occur on the resin surface before the resin solidifies, the resin lining layer c finally formed on the inner wait of the pipe 1 presents an uneven surface, resulting in a lining layer having an ununiform thickness.

Since many experiments indicate that it is necessary to use a low viscosity resin which has a thixothropy property so that the resin may be exactly transported through a pipe along the entire length thereof, the above two problems as shown in FIGS. 4 and 5 have been proved to be difficult to overcome.

SUMMARY OF THE INVENTION

An object of the present invention is to solve the above-mentioned problems peculiar to the above-mentioned prior art, and to provide an improved pipe lining method which is capable not only to solve the above problems, but also to obtain a greatly reinforced resin lining layer stronger than a resin lining layer obtained in a conventional method, thereby achieving an improved rehabilitation effect for an existing pipe.

According to the present invention, there is provided a method for lining the internal surface of a pipe having a first open end and a second open end. Said method comprises the steps of introducing a predetermined amount of a resin into the pipe through the first open end thereof, causing the introduced resin to move through the pipe toward the second open end thereof, so as to form a resin lining layer on the internal surface of the pipe, blowing into the pipe a predetermined amount of flake material and causing the flake material to adhere to the surface of resin lining layer in the pipe, inserting into the pipe a ball-like pig having a predetermined diameter such that an even resin lining layer having a desired uniform thickness may be formed on the internal surface of the pipe, and causing the inserted ball-like pig to move through the pipe along the entire length thereof, thereby embeding the above flake material into the resin lining layer, and forming on the pipe internal surface an even resin lining layer having a desired uniform thickness.

In one aspect of the present invention, the flake material is embedded into uncured resin layer so as to obtain a reinforced resin lining layer upon resin hardening. Said flake material is made of a synthetic short fiber which is a glass fiber, carbon fiber or polyester fiber.

Further, said predetermined amount of the flake material may be introduced into the pipe through either the first open end or the second open end of the pipe, by means of a high speed air flowing into the pipe, such that the flake material may adhere to the surface of the resin lining layer in the pipe.

In another aspect of the present invention, the ball-like pig is caused to move through the pipe, either by virtue of a suction force generated by a suction pump, or by virtue of a pushing force generated by an air blower.

The above objects and features of the present invention will become more understood from the following description with reference to the accompanying drawings.

DETAILED DESCRIPTION OF THE PREFERRED EMBODIMENTS

One embodiment of a method according to the present invention will be described in detail below, with reference to the accompanying drawings including FIGS. 1–3.

Figure 1:
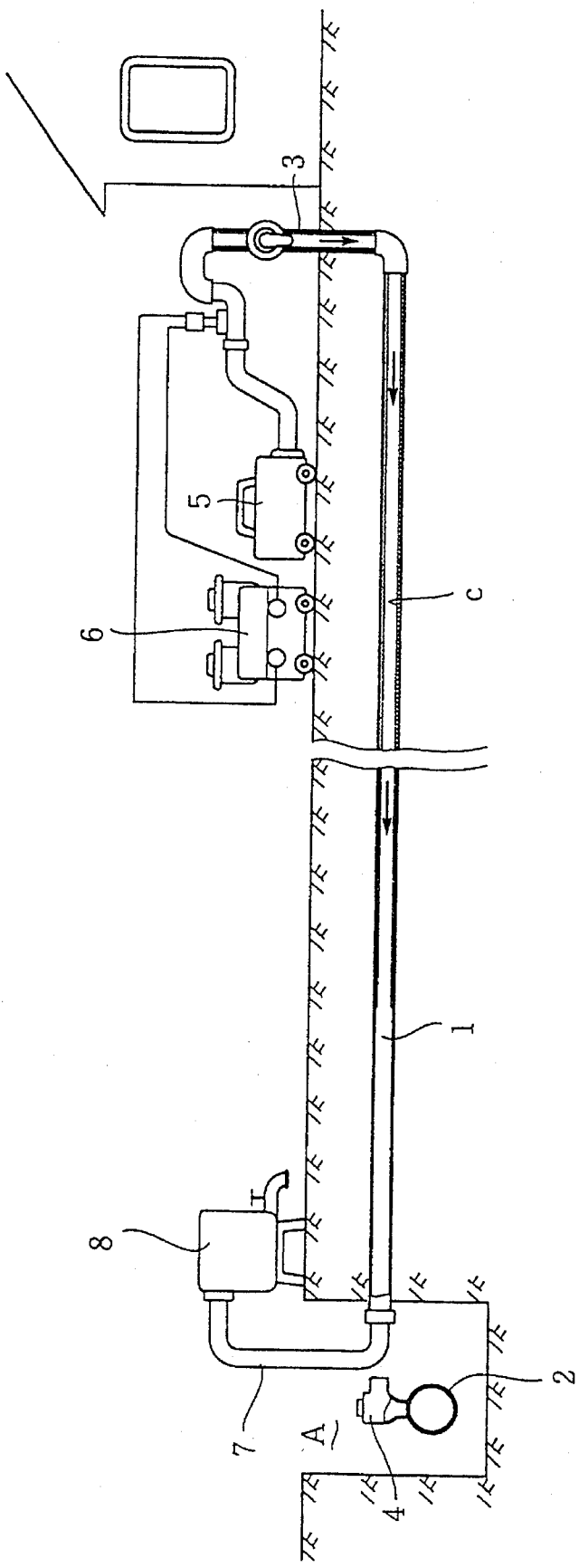
FIG. 1 is an explanatory view illustrating a first process of the method according to the present invention, this process is also employed in a conventional method.

Referring to FIG. 1, reference numeral 1 represents an existing underground pipe to be treated in the resin lining treatment, which is branching from a main pipe 2 (buried on road side) and extending to a user's house.

In fact, the pipe 1 is used as a service pipe including a meter riser 3 which extends out of ground surface. The meter riser 3 is provided at one end thereof with a meter (not shown) which shall be removed therefrom so as to form a first open end for the resin lining operation. On the other hand, a pit A is formed by digging at a position where the service pipe 1 is branching from the main pipe 2, so that the branching position is exposed and the service pipe 1 is separated from the main pipe 2 by being separated from a service tee 4. In this way, a second open end is formed on the service pipe 1 for the resin lining operation.

A first process of the method according to the present invention is illustrated in FIG. 1, which is carried out in the same manner using the same equipments as the above-discussed prior art.

Namely, before the lining operation, an air blower 5 and a resin mixing/supplying apparatus 6 are connected to the first open end of the service pipe 1, whilst an extra resin receiving tank 8 is connected through a hose 7 to the second open end thereof.

By operating the air blower 5, an air flow having a high speed is generated to cause a mixed liquid resin (supplied from the resin mixing/supplying apparatus 6) to flow into the meter riser 3. Then, by means of the same air flow, the resin is forced to flow into and through the service pipe 1 toward the second open end thereof, so that a resin lining layer c is formed on the internal surface of the pipe 1. A small amount of an extra resin is caused to flow out of the pipe 1 so as to be received into the receiving tank 8 via the hose 7.

Figure 2:
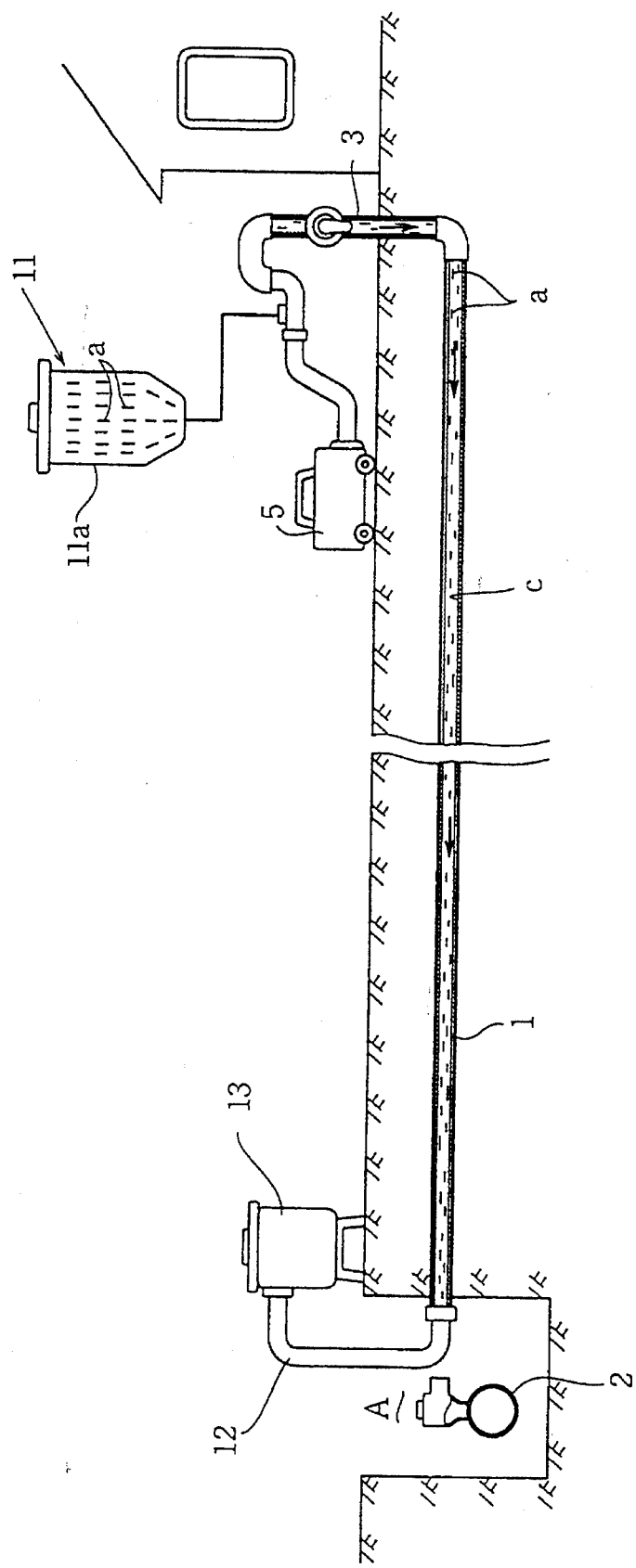
FIG. 2 is an explanatory view illustrating a second process of the method according to the present invention.

A second process of the method according to the present invention is illustrated in FIG. 2.

As shown in FIG. 2, the air blower 5 remains in the same condition as in the first process, a flake material supply apparatus 11 comprising a tank 11a into which a predetermined amount of flake material a is received in advance, is positioned near by with its outlet connected to the air blowing passage of the air blower 5. Further, an extra flake material receiving tank 13 is connected through a hose 12 to the second open end of the pipe 1.

Here, the flake material a is made of a synthetic short fiber which is a glass fiber, carbon fiber or polyester fiber. Such flake material is used as a reinforcing material to be embeded into the resin lining layer c so as to obtain a greatly reinforced lining layer stronger than a resin lining layer obtained in a conventional method.

By operating the air blower 5, an air flow having a high speed is generated to cause the flake material (supplied from the flake material supplying apparatus 11) to fly into the meter riser 3. Then, by means of the same air flow, the flake material a is blown into and through the service pipe 1 toward the second open end thereof, so that the flake material will adhere to the surface of the resin lining layer in the pipe 1. As illustrated in FIG. 2, a small amount of extra flake material will be received into the extra flake material receiving tank 13 through the hose 12.

Although it is illustrated in FIG. 2 that the flake material a is introduced into the service pipe 1 through the first open end thereof (on the meter riser 3), it is also possible to introduce the flake material a into the pipe 1 through the second open end (in the pit A).

Figure 3:
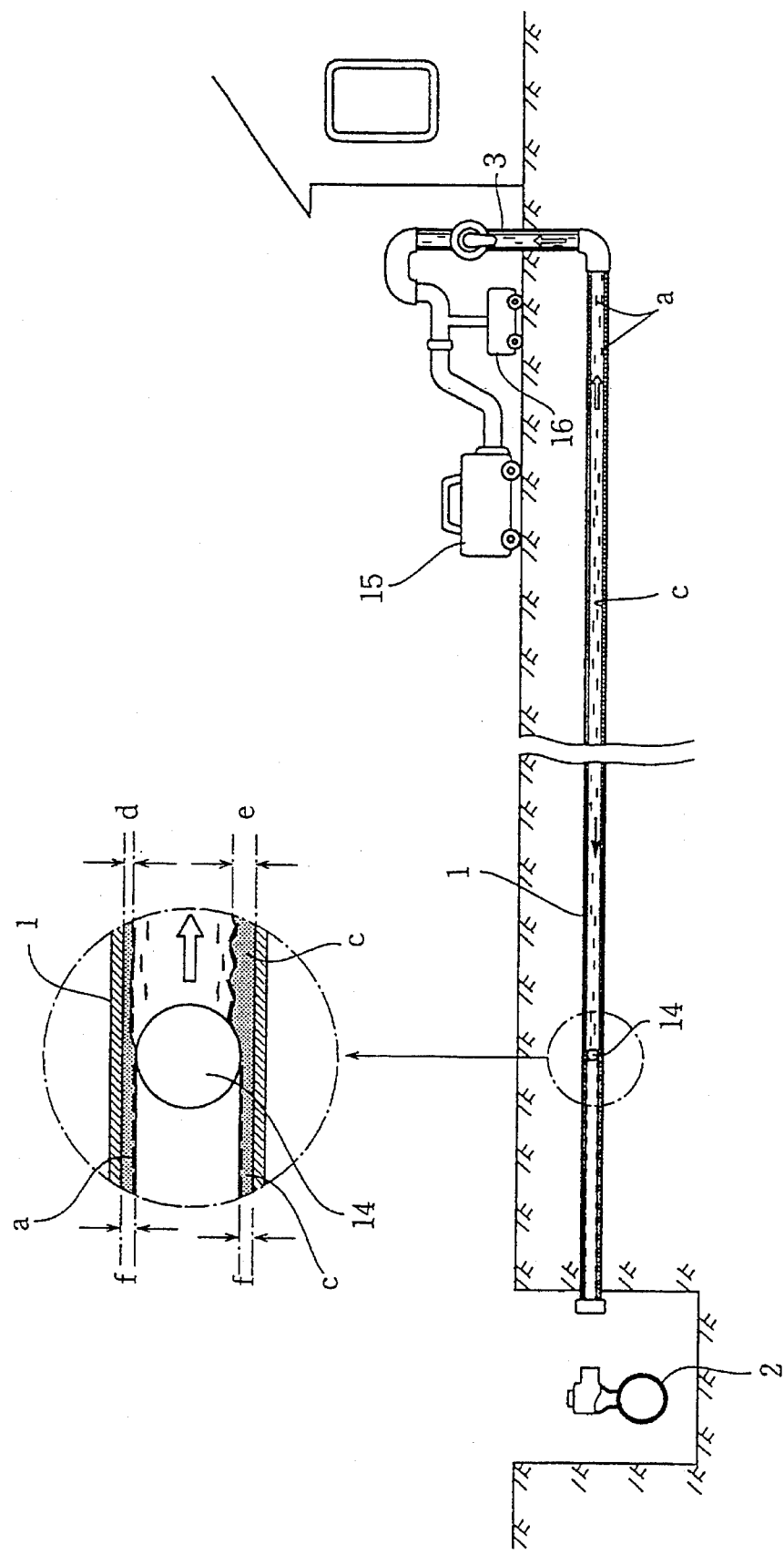
FIG. 3 is an explanatory view illustrating a third process of the method according to the present invention.
Figure 4:
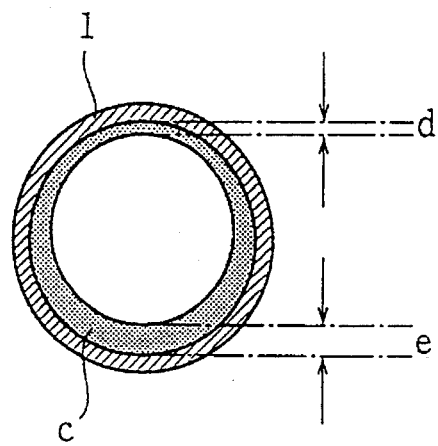
FIG. 4 is a lateral cross sectional view illustrating a resin lining layer formed on the internal surface of an existing pipe, using a conventional method.
Figure 5:
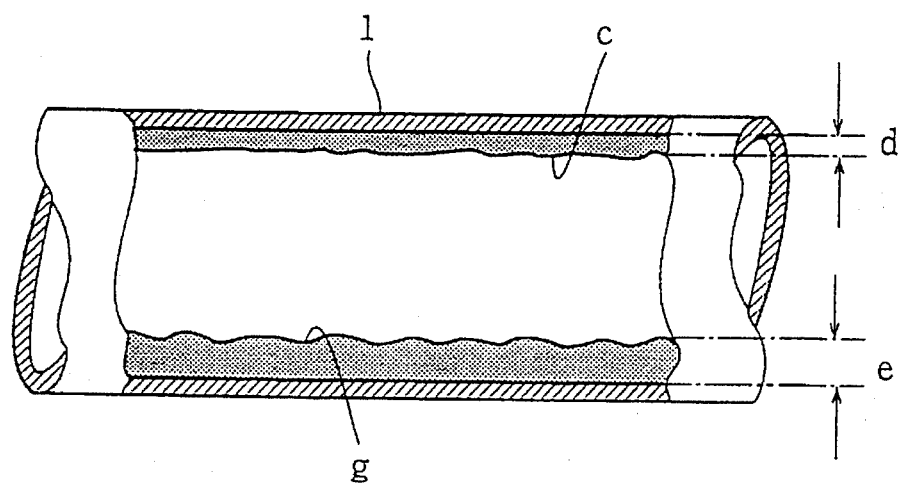
FIG. 5 is a longitudinal cross sectional and partially elevational view illustrating a resin lining layer formed on the internal surface of an existing pipe, using a conventional method.

A third process of the method according to the present invention is illustrated in FIG. 3.

As shown in FIG. 3, a suction pump 15 is connected to the first open end of the service pipe 1, an extra resin receiving tank 16 is positioned near by with its inlet connected in the suction passage of the suction pump 15.

At first, a ball-like pig 14 is inserted into the pipe 1 through the second open end thereof. Then, the suction pump 15 is operated to produce a suction force, so that the pig 14 is caused to move from the second open end toward the first open end of the pipe 1.

The ball-like pig 14 has a predetermined diameter such that with the movement of the pig 14 through the pipe 1, an even resin lining layer c having a desired uniform thickness f may be formed on the pipe internal surface. Also, while the ball-like pig 14 is moving through the pipe 1, the uncured resin lining layer c will be pressed against the pipe inner wall and kneaded circumferentially, so that the flake material a already adhered to the surface of the resin lining layer will be further embeded deep into the layer c. In this way, the resin lining layer c will be reinforced, so that it is possible not only to prevent the flowing away or flowing down of the uncured resin, but also to obtain a greatly reinforced resin lining layer stronger than a resin lining layer obtained in a conventional method.

After the formation of the even resin lining layer c having a uniform thickness, the extra resin will be caused to move out of the pipe 1 through the first open end thereof and be received in the extra resin receiving tank 16.

Although, it is illustrated in FIG. 3 that the ball-like pig 14 is forced to move through the pipe 1 by a suction force generated by the suction pump 15, it is also possible to have an air blower (not shown) connected to the second open end of the pipe 1, so as to provide a pushing force to cause the pig 14 to move through the pipe 1 in the same manner.

Clearly, it is essential that the above-described second and third processes should be performed before the resin lining layer c formed during the above first process becomes hardened.

It is understood from the above description that, with the use of the method according to the present invention, an even resin lining layer having a desired and uniform thickness may be formed on the internal surface of an existing underground pipe, with resin thickness on the top being equal to that on the bottom.

Moreover, with the use of the method according to the present invention, since a flake material made of a synthetic short fiber is caused to adhere to the uncured resin layer and is further embeded deep into the resin layer, the resin lining layer formed on the internal surface of the existing pipe will be greatly reinforced. Therefore, it is possible not only to prevent the flowing away or flowing down of the uncured resin layer, but also to obtain a greatly reinforced resin lining layer stronger than a resin lining layer obtained in a conventional method.

While the presently preferred embodiments of the this invention have been shown and described above, it is to be understood that these disclosures are for the purpose of illustration and that various changes and modifications may be made without departing form the scope of the invention as set forth in the appended claims.

What is claimed is:

1. A method for lining the internal surface of a pipe having a first open end and a second open end, said method comprising the steps of:

introducing a predetermined amount of a resin into the pipe through the first open end thereof;

causing the introduced resin to move through the pipe toward the second open end thereof, so as to form a resin lining layer on the internal surface of the pipe;

blowing into the pipe a predetermined amount of flake material and causing the flake material to adhere to the surface of resin lining layer in the pipe;

inserting into the pipe a ball-like pig having a predetermined diameter such that an even resin lining layer having a desired uniform thickness may be formed on the internal surface of the pipe; and causing the inserted ball-like pig to move through the pipe along the entire length thereof, thereby embedding the above flake material into the resin lining layer, and forming on the pipe internal surface an even resin lining layer having a desired uniform thickness.

2. The method according to claim 1, wherein the flake material is embeded into uncured resin layer so as to obtain a reinforced resin lining layer upon resin hardening.

3. The method according to claim 1, wherein the flake material is made of a synthetic short fiber.

4. The method according to claim 3, wherein the synthetic short fiber is one selected from the group consisting of glass fiber, carbon fiber and polyester fiber.

5. The method according to claim 1, wherein a predetermined amount of the flake material is introduced into the pipe through one of the first open end and the second open end of the pipe.

6. The method according to claim 1, wherein a predetermined amount of the flake material is introduced into the pipe by means of a high speed air flowing into the pipe, such that the flake material may adhere to the surface of the resin lining layer in the pipe.

7. The method according to claim 1, wherein an extra flake material receiving means is provided at one open end of the pipe opposite to an open end through which the flake material is introduced into the pipe.

8. The method according to claim 1, wherein the ball-like pig is caused to move through the pipe by a suction force generated by a suction pump.

9. The method according to claim 1, wherein the ball-like pig is caused to move through the pipe by a pushing force generated by an air blower.

10. The method according to claim 1, wherein an extra resin receiving means is provided at one open end of the pipe opposite to an open end through which the ball-like pig is introduced into the pipe.

\* \* \* \* \*